United States Patent [19]

Osanai

[11] 4,342,058
[45] Jul. 27, 1982

[54] APPARATUS FOR RUNNING MAGNETIC TAPES

[75] Inventor: Akira Osanai, Hachioji, Japan

[73] Assignee: Olympus Optical Co., Ltd., Tokyo, Japan

[21] Appl. No.: 139,743

[22] Filed: Apr. 14, 1980

[30] Foreign Application Priority Data

| Apr. 20, 1979 | [JP] | Japan | 54-48697 |
| Apr. 20, 1979 | [JP] | Japan | 54-48699 |
| May 8, 1979 | [JP] | Japan | 54-60933[U] |
| May 8, 1979 | [JP] | Japan | 54-60934[U] |

[51] Int. Cl.³ .................. G11B 15/66; G11B 23/04
[52] U.S. Cl. .................. 360/96.5; 242/199; 360/132
[58] Field of Search .......... 360/96.5, 96.6, 93, 360/132, 96.1, 137; 242/197–199

[56] References Cited

U.S. PATENT DOCUMENTS

| 3,601,558 | 8/1971 | Sugaya et al. | 360/132 |
| 4,050,087 | 9/1977 | Kishi | 360/96.6 |
| 4,060,838 | 11/1977 | Meermans | 360/96.5 |
| 4,177,490 | 12/1979 | Broghammer | 360/96.5 |
| 4,250,527 | 2/1981 | Broghammer | 360/96.5 |

FOREIGN PATENT DOCUMENTS 52-49809 4/1977 Japan ........................... 360/96.5

Primary Examiner—Alfred H. Eddleman
Attorney, Agent, or Firm—Frishauf, Holtz, Goodman & Woodward

[57] ABSTRACT

An apparatus for running magnetic tapes has three projecting pins each of which has a cylindrical portion and a free end portion. The three projecting pins hold at the cylindrical portions thereof a tape cassette containing a roll of magnetic tape selectively in a first position and second position which is closer to the free end portion than the first position. On the cylindrical portion of one of three projecting pins a first flange is provided for selectively preventing the tape cassette from moving from the first position to the second position. On the cylindrical portion of each of three projecting pins a second flange is provided for selectively preventing the tape cassette from being released from the three projecting pins. The apparatus also comprises a displacement member moved by the cassette when the cassette is moved between the first and the second position and a power switch connected to a motor for running the tape. The power switch sets the motor to the tape-running mode when the cassette moves from the second to the first position and to the tape-stop mode when the cassette moves from the first to the second position.

20 Claims, 4 Drawing Figures

APPARATUS FOR RUNNING MAGNETIC TAPES

BACKGROUND OF THE INVENTION

This invention relates to an apparatus for running a magnetic tape, which holds in the operating position a tape cassette containing a roll of magnetic tape and which is provided with tape-running means for running the magnetic tape when set to a tape-running mode and stopping the magnetic tape when set to a tape-stop mode.

A tape-running apparatus is known, which has tape-running means which is automatically set to a tape-running mode when a tape cassette is placed at a predetermined position. Being easy to operate, this tape-running apparatus is popular.

Two types of tape-running apparatus are known. One is called the "Starr system", and the other "kangaroo pocket system". With the Starr system, when a tape cassette is placed at the operating position, a movable chassis with capstans, reel-driving shafts and other members, moves up and comes into engagement with the tape cassette. With the kangaroo pocket system, a tape cassette is put into the cassette holder secured to a cassette cover, and the cassette cover is then swung to place the tape cassette in the operating position. The cassette cover covers that surface of the cassette which has reel shaft openings into which reel-driving shafts are inserted. Both types of known tape-running apparatus are disadvantageous in two respects. First, they need a complicated mechanism for placing a tape cassette in the operating position. Secondly, the roll of tape cannot well be seen from outside once the tape cassette has been placed into the operating position.

Another type of tape-running apparatus called "direct loading system" is known. The direct loading system has no cassette cover, thus exposing to view the roll of tape contained in a cassette which is held in the operating position and thus simplifying the mechanism for placing a tape cassette in the operating position. When the tape cassette is released from the operating position, however, it jumps out such that it may be broken if it hits something. The direct loading system has another drawback. Since it has no cassette cover, a magnetic head and pinch rollers of the system are exposed to dust in the air. Dust may adhere onto the magnetic head and pinch rollers to cause troubles, particularly when the apparatus of the direct loading system is used outdoors or when it is incorporated into a car stereo system. Therefore, the direct loading system has not been used in the the car stereo systems.

SUMMARY OF THE INVENTION

It is an object of this invention to provide an apparatus for running a magnetic tape, which allows a roll of tape contained in a tape cassette to be seen well from outside and which prevents the tape cassette from jumping out when it is released from the operating position.

Another object of this invention is to provide an apparatus for running a magnetic tape, which protects a magnetic head and pinch rollers from dust in the air.

DETAILED DESCRIPTION OF THE PREFERRED EMBODIMENTS

Now referring to the accompanying drawings, an embodiment of the invention will be described in detail.

A tape-running apparatus according to this invention may be used in, for example, a car stereo system. As indicated by two-dot chain lines in FIG. 1, a cassette 10 containing a roll of magnetic recording tape (not shown) has a pair of openings 12 and four elongated holes 14, 16, 18 and 20 at its front and rear walls respectively. The openings 12 are formed in the central portion of the cassette 10, and are for inserting reel-driving shafts provided in a tape-running apparatus. The first to third elongated holes 14, 16 and 18 are formed respectively in the upper-middle, lower-left and lower-right portions of the cassette 10. These holes are for inserting cassette-positioning pins provided in a tape running apparatus. The fourth elongated hole 20 is formed in the lower-middle portion of the cassette 10. The hole 20 is for inserting a capstan if the cassette 10 is used in another type of tape-running apparatus.

The lower side wall of the cassette 10 has windows (not shown) for inserting a pinch roller and a magnetic head provided in a tape-running apparatus. On the left and right side walls of the cassette 10 there are provided two removable lugs (not shown) for preventing accidental erasure of signals recorded in advance on the magnetic tape. The cassette is a small-sized one of known type, and is used for a cassette tape recorder which can be put into the breast pocket of man's jacket.

Figure 1:
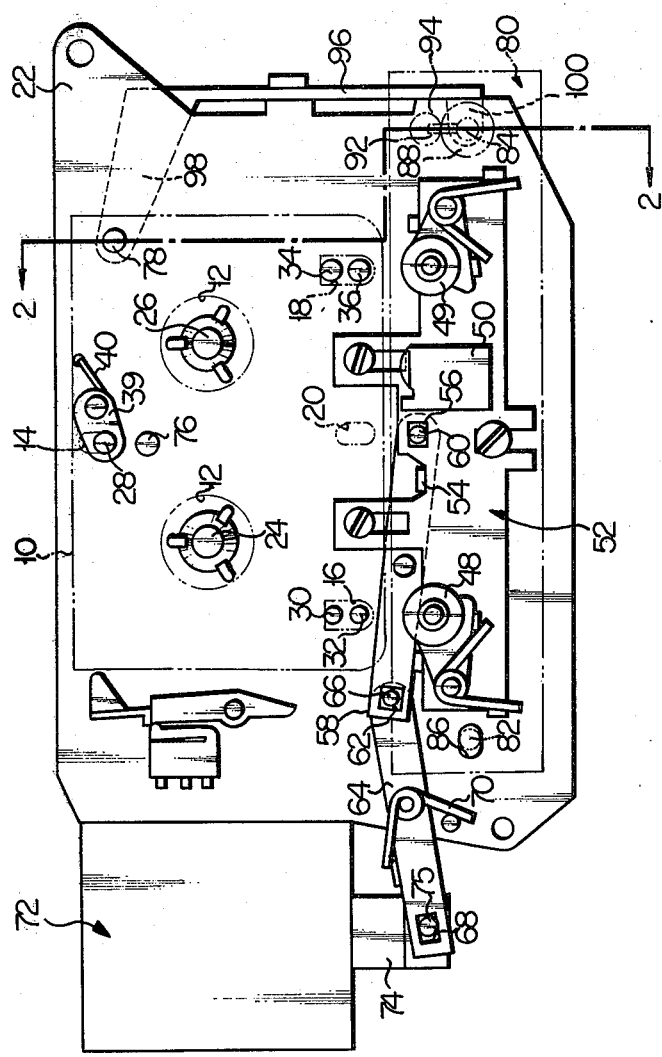
FIG. 1 is a front view of an apparatus according to this invention, schematically illustrating the structure of the apparatus.

At a rear side of the cassette 10 a chassis 22 of the tape-running apparatus is located. The chassis 22 is a plate which extends in the vertical direction. It is parallel to the rear wall of the cassette and it serves as a top plate of the car stereo system. To the chassis 22 a pair of reel-driving shafts 24, 26, and first and second capstans 32 and 36 are rotatably mounted. All of them project forwardly and are perpendicular to the chassis 22. The reel-driving shafts 24, 26 are inserted into a pair of openings 12 as shown in FIG. 1, and the first capstan 32 is inserted into the second elongated hole 16, and the second capstan 36 is inserted into the third elongated hole 18. On the chassis 22 first to third cassette-positioning pins 28, 30 and 34 are mounted. These cassette-positioning pins 28, 30 and 34 project forwardly and are perpendicular to the chassis 22. The second cassette-positioning pin 30 is planted on a front surface of the chassis 22 over the first capstan 32, and is inserted into the second elongated hole 16. The third cassette-positioning pin 34 is planted on the front surface of the chassis 22 over the second capstan 36, and is inserted into the third elongated hole 18.

Figure 2:
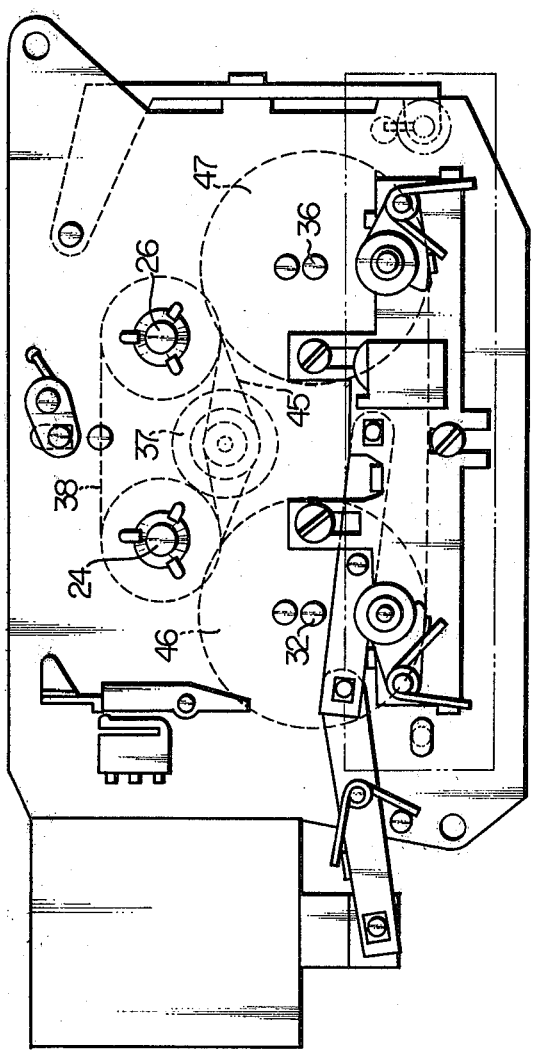
FIG. 2 is another front view of the apparatus shown in FIG. 1, also schematically illustrating a structure of a tape running means for running a magnetic tape used in the apparatus.

As shown in FIG. 2, a motor 37 is secured to a rear surface of the chassis 22. To this motor 37 the reel-driving shafts 24 and 26 are connected by means of a belt 38. The shafts 24 and 26 can be selectively rotated by the motor 37. A plate 39 is located in parallel to with front surface of the chassis 22, and is rotatably connected at its right end portion to the chassis 22 by a shaft (not shown) perpendicular to the front surface of the chassis 22. To the left end portion of the front surface of the plate 39 the first cassette-positioning pin 28 is secured to extend forwardly. The first cassette-positioning pin 28 is perpendicular to the chassis 22. A rotation control pin (not shown) protrudes from the left end portion of the rear surface of the plate 39 and extends through an elongated hole (not shown) which is formed in the chassis 22 and which extends in the vertical direction. The rotation control pin is coaxial with the cassette-positioning pin 28, and the elongated hole is longer than the first elongated hole 14 of the cassette 10. When the cassette 10 is out of the tape-running apparatus, the rotation control pin can move for a distance longer than the distance defined by the elongated hole 14 as the plate 39 is rotated in parallel with the front surface of the chassis 22. The plate 39 is urged always to rotate counterclockwise, by a torsion coil spring 40 a portion of which is shown in FIGS. 1 and 2. The spring 40 is wound around the shaft for rotation of the plate 39 so that it is made smaller than otherwise.

Figure 3:
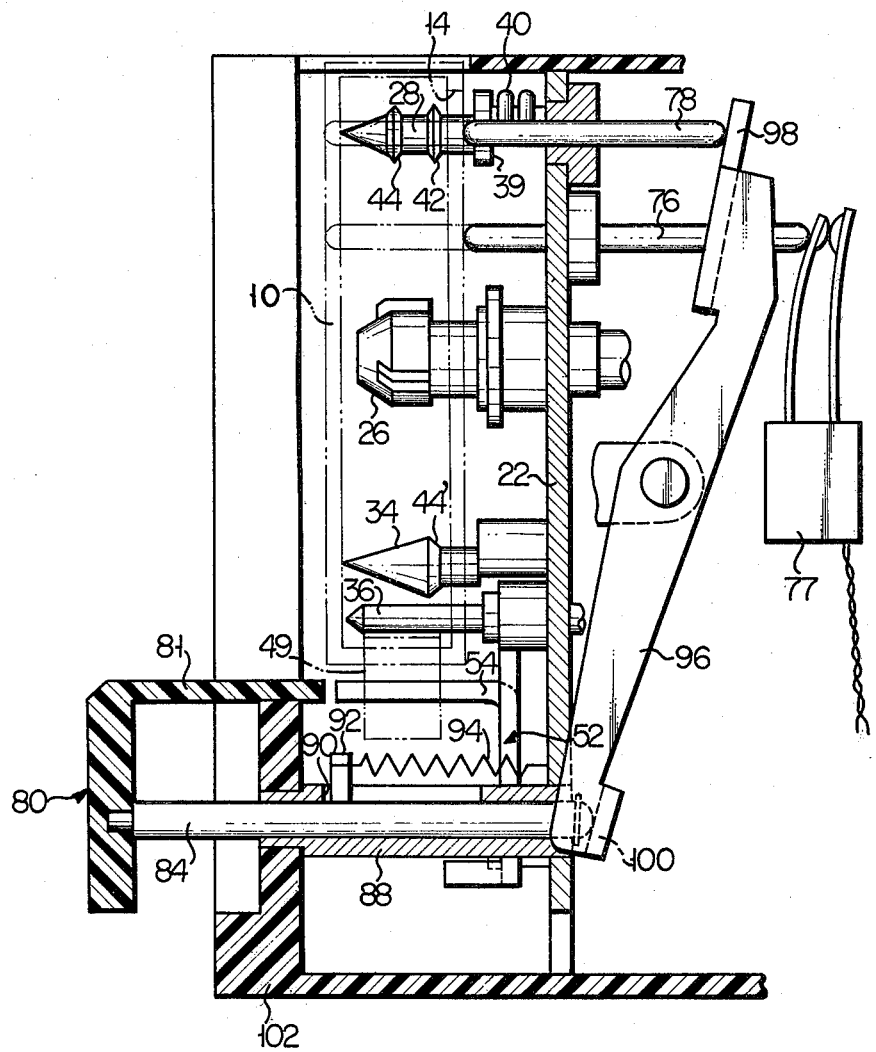
FIG. 3 is a cross sectional view of the apparatus shown in FIG. 1, taken along line 2—2 in FIG. 1 and illustrating a tape cassette placed in a first position.

As illustrated in FIG. 3, the first cassette-positioning pin 28 comprises a conical free end portion and a cylindrical portion. A first and a second stop means 42 and 44 are formed on that portion of the cylindrical portion which is fully within the cassette 10 when the cassette 10 is placed in the operating position, or a first position, as indicated by two-dot chain lines in FIG. 3. The first and second stop means 42 and 44 are spaced apart and each have a flange-shape. The second stop means 44 is provided at the junction of the free end portion and the cylindrical portion. The first stop means 42 is spaced from the second stop means 44 toward the base of the pin 28 for a distance a little longer than the thickness of the rear wall of the cassette 10. As shown in FIG. 3, the front surfaces of the first and second stop means incline backwardly, and the rear surfaces of the first and second stop means incline forwardly and intersect the front surfaces. Therefore, both first and second stop means have a triangular sectional profile. As illustrated in FIG. 2, in the back side of the chassis 22 the first and second capstans 32 and 36 are secured respectively to flywheels 46 and 47 which are driven by the motor 37 by means of a belt 45. Thus, both capstans 32 and 36 can be rotated counterclockwise at a constant speed.

As shown in FIG. 3, the third cassette-positioning pin 34 comprises a conical free end portion, a cylindrical portion and an intermediate portion connecting the free end portion to the cylindrical portion. The cylindrical portion has a diameter smaller than that of the base of the conical free end portion. The intermediate portion is shaped like a truncated cone and is a second stop means 44' which functions as means for preventing the cassette 10 from jumping out of the apparatus. Both the free end portion and the second stop means 44' are within the cassette 10 when the cassette 10 is placed in the first position as shown in FIG. 3. The second stop means 44' lies very close to the inner surface of the rear wall of the cassette 10 when the cassette 10 is placed in the first position. The second cassette-positioning pin 30 is identical with the pin 34 with respect to shape and size. The three cassette-positioning pins 28, 30 and 34 constitute a cassette-holding mechanism.

As shown in FIG. 1, a plate 52 is provided in front of the chassis 22 and extending parallel to the chassis 22. As shown in FIG. 3, pinch rollers 48 and 49 are projecting from the front surface of the plate 52 perpendicular thereto, and a magnetic head 50 is mounted on the front surface of the movable plate 52. As illustrated in FIG. 1 the rollers 48 and 49 are located right under the first capstan 32 and the second capstan 36, repectively. The plate 52 is movable in a vertical direction. When the plate 52 is moved up, the pinch roller 48 is inserted into the window (not shown) formed in the front wall of the cassette 10 and cooperates with the first capstan 32 to pinch the tape (not shown) contained in the cassette 10, and the pinch roller 49 is also inserted into the window and cooperates with the capstan 36 to pinch the tape. The pinch rollers 48 and 49 and the plate 52 constitute a tape-operating means. The tape-operating means moves between a first position where the pinch rollers 48 and 49 cooperate with the first and second capstans 32 and 36 to pinch the tape and a second position where the pinch rollers 48 and 49 are spaced from the tape.

The magnetic head 50 is located halfway between the pinch rollers 48 and 49. When the plate 52 is moved to the first position, the upper portion of the magnetic head 50 is inserted into the window and comes into contact with the magnetic tape. So long as it contacts the tape, the head 50 may reproduce sounds such as music, if the music is recorded on the tape in advance or may record sounds, such as music. When the plate 52 is moved down to the second position, the head 50 comes out of contact with the tape.

As illustrated in FIGS. 1 and 3, a holding means 54 is projecting forwardly from the middle portion of the upper edge of the plate 52 perpendicular to the plate 52, for a distance larger than the length of the pinch rollers 48 and 49 and the height of the magnetic head 50. When the plate 52 is moved up to the first position, the holding means 54 comes into a horizontal alignment with the roof of a cover, which will later be described. When the plate 52 is moved down to the second position, it lies below the roof of the cover.

As shown in FIG. 1, the plate 52 has an opening 56 which is close to the holding means 54. In the opening 56 there is inserted a pin 60 secured to the right end portion of a front surface of a first arm 58. The first arm 58 extends parallel to the front surface of the chassis 22 and is substantially horizontal. The first arm 58 has its middle portion pivotally fastened to the front surface of the chassis 22 and thus is rotatable. The left end portion of the first arm 58 has an opening 62. In this opening 62 there is inserted a pin 66 secured to the right end portion of a front surface of a second arm 64. Like the first arm 58, the second arm 64 extends parallel to the front surface of the chassis 22 and substantially horizontally, has its middle portion pivotally fastened to the front surface of the chassis 22, and is thus rotatable. The left end portion of the second arm 64 has an opening 68. The second arm 64 is urged by urging means, a torsion coil spring 70 in this embodiment, so as to rotate counterclockwise. In the opening 68 a pin 75 is inserted, which is secured to the lower end of a rod 74. The rod 74 is projecting downwardly from a plunger 72 fixed to the left end portion of the chassis 22.

When the plunger 72 is supplied with electric current, the rod 74 is pulled upwardly by a solenoid (not shown) disposed in the plunger 72. At the same time, the plate 52 is moved up to the first position by the function of the first and second arms 58, 64. When the current supply to the plunger 72 is stopped, the rod 74 is pulled downwardly by the urging force of the torsion coil spring 70. At the same time, the plate 52 is moved down to the second position by the function of the first and second arms 58, 64.

A first displacement member 76 in the form of a rod is extending through the chassis 22 perpendicular thereto, right under the first cassette-positioning pin 28. The member 76 can move back and forth and is urged by urging means (not shown) to project forward from the chassis 22. When it protrudes forward as indicated by a two-dot chain line in FIG. 3, its front end takes the position where the front wall of the cassette 10 lies when the cassette 10 is placed in the position, or the operating position. When the cassette 10 is placed in the first position and lies parallel to the chassis 22, the rear wall of the cassette 10 come into contact with the front end of the member 76, and the first displacement member 76 is pushed back to the position which is indicated by a solid line in FIG. 2.

As shown in FIG. 3, a power switch 77 is disposed behind the first displacement member 76. The power switch 77 and the first displacement member 76 constitute a switching means. The power switch 77 serves to supply electric current to the motor 37 and an amplifier (not shown). When the cassette 10 is put in the first position and the first displacement member 76 moves back into the position indicated by the solid line in FIG. 2, the power switch 77 is closed by the member 76 to supply current to the motor 37, thereby setting the motor 37 to tape-running mode. Once set to tape-running mode, the motor 37 rotates the reel-driving shafts 24 and 26 and the first and second capstans 32 and 36 thereby to run the tape (not shown) contained in the cassette 10. Unless the tape cassette 10 is placed exactly in the first position, the first displacement member 76 is outside said position where it closes the power switch 77. Thus, so long as the cassette 10 is outside the first position, the power switch 77 remains open, the motor 37 is set to tape-stop mode, and the tape can not be run.

Through the chassis 22 a second displacement member 78 in the form of a rod extends at, as shown in FIG. 1, the portion of the chassis 22 which corresponds to the upper-right corner of the cassette 10 placed in the first position. The second displacement member 78 can move back and forth. When the member 78 lies in the most forward position indicated by a two-dot chain line in FIG. 3, its front end is located at the position where the front wall of the cassette 10 lies when the cassette 10 is put in the first position.

A cover 80 is provided in front of the chassis 22. As illustrated in FIG. 3, the cover 80 has an L-shaped sectional profile. Its roof 81 extends toward the chassis 22, perpendicular thereto. When the plate 52 is moved down to the second position, the roof 81 blocks the passage of the plate 52 between the first position and the second position and covers the pinch rollers 48 and 49 and the magnetic head 50 which are mounted on the plate 52. To the left and right portions of the rear surface of the cover 80 a first guide pin 82 and a second guide pin 84 are secured, respectively. The first and second guide pins 82 and 84 project toward the chassis 22 and are perpendicular to the chassis 22. The first guide pin 82 extends through a hole 86 made in the chassis 22 and is elongated in the horizontal direction as shown in FIG. 1. It can move back and forth. The second guide pin 84 slidably extends through a guide cylinder 88 which protrudes from, and is perpendicular to, and fixed to the front surface of the chassis 22. It can move back and forth, too. The rear end portion of the second guide pin 84 is always projecting from the back of the chassis 22.

The guide cylinder 88 has an elongated guide slit 90 which is formed in the uppermost portion, directly over and parallel to the axis of the cylinder 88. Inserted in the guide slit 90 is a pin 92 which protrudes vertically from the second guide pin 84. The pin 92 moves back and forth in the guide slit 90 as the second guide pin 84 moves likewise. As shown in FIG. 3, a coil spring 94 is connected at one end to the pin 92 and at the other end to the chassis in such a way that it extends parallel to the axis of the guide cylinder 88. The coil spring 94 therefore urges the second guide pin 84 to move backward. The coil spring 94 may be replaced by other urging means, but it is preferable because it occupies but a small space. The second displacement member 78 constitutes a cover-moving mechanism jointly with a connection means described later.

On the right side of the chassis 22 a lever 96 is provided. The lever 96 is a one member of the connection means and is pivotally connected at its middle portion to the right side of the chassis 22 as shown in FIGS. 1 and 3. As shown in FIG. 3, a first strip 98 is secured to the upper end of the lever 96, and a second strip 100 to the lower end of the lever 96. The first strip 98 extends slantly upward behind the chassis 22, with its free end placed in the passage of the rear end of the second displacement member 78. The second strip 100 extends to the left behind the chassis 22, with its free end in the passage of the rear end of the second guide pin 84. The rear end of the second guide pin 84 which is urged by the coil spring 94 always lies in contact with the second strip 100.

As long as the cassette 10 is outside the first position, the lever 96 shown in FIG. 3 is urged in counterclockwise direction since the coil spring 96 pushes the second guide pin 84 backwardly. In this condition the first strip 98 pushes the rear end of the second displacement member 78 forward into the position indicated by the two-dot chain line. The cover 80, urged by the coil spring 94, is pulled backward so that its roof 81 blocks the passage of the tape-operating means, i.e. the pinch rollers 48 and 49 and the magnetic head 50. That is, the roof 81 lies in the passage of the tape-operating means and covers the pinch rollers 48 and 49 and the magnetic head 50. This position of the cover 80 will hereinafter be referred to as "first position".

When the cassette 10 is placed in the first position, thus parallel to the chassis 22, as shown in FIG. 3, the second displacement member 78 is pushed backward by the rear wall of the cassette 10, and thus rocks the lever 96 clockwise. The second strip 100 therefore pushes the second guide pin 84 forward against the urging force of the coil spring 94. As a result, the cover 80 is moved forward, and the roof 81 of the cover 80 comes out of the passage of the tape-operating means. The forward position of the cover 80 will hereinafter referred to as "second position".

The second guide pin 84 and the lever 96 constitutes a connection means which connects the second displacement member 78 to the cover 80.

As illustrated in FIG. 3, the chassis 22 is disposed in a housing 102 the front of which has an opening through which the tape cassette 10 may be put into, and taken out of, the first position, while held by fingers.

Now it will be described how the apparatus of the above-mentioned structure operates.

When the tape cassette 10 is placed in the first position, parallel to the chassis 22, the reel-driving shafts 24 and 26 are inserted respectively into the two openings 12 as shown in FIGS. 1 and 3. At the same time, the first cassette-positioning pin 28 is inserted into the first elongated hole 14, the second cassette-positioning pin 30 and the fist capstan 32 into the second elongated hole 16, and the third cassette-positioning pin 34 and the second capstan 36 into the third elongated hole 18. Since the plate 39 is urged by the torsion coil spring 40 to rotate counterclockwise, the first cassette-positioning pin 28 moves downwardly thereby to push down the cassette 10 at its cylindrical portion which is right behind the first stop means 42, until the cylindrical portions of the second and third cassette-positioning pins 30 and 34 come into contact with the upper portions of the peripheral surfaces which define the second and third elongated holes 16 and 18 made in the rear wall of the cassette 10. In this way, the three cassette-positioning pins 28, 30 and 34 hold the cassette 10 steadfastly in the first position. Since the cassette 10 located in the first position is covered with nothing, the roll of tape contained in the cassette is exposed to view.

Pushed by the cassette 10, the first displacement member 76 moves backward against an urging means (not shown) which urges the member 76 forward. It closes the power switch 77 when the cassette 10 is completely put into the first position, as shown in FIG. 3. At the same time, the second displacement member 78 is pushed backward by the cassette 10 to move the first strip 98 backward. As a result, the lever 96 rocks clockwise to move the second guide pin 84 forward against the urging force of the coil spring 94, via the second strip 100. The cover 80 therefore moves forward, and its roof 81 comes out of the passage of the tape-operating means i.e. pinch rollers 48 and 49 and the magnetic head 50.

As soon as the power switch 77 is closed, electric power is supplied to the motor 37, the amplifier (not shown) and the plunger 72, thus setting these devices to the tape-running mode. The solenoid (not shown) of the plunger 72 then pulls up the rod 74, thereby moving the plate 52 against the urging force of the torsion coil spring 70 via the second arm 64 and the first arm 58. The tape-operating means therefore moves up to its first position, whereby the pinch rollers 48 and 49 cooperate with the first and second capstants 32 and 36 to pinch the magnetic tape. Then the first and second capstans 32 and 36, which are rotated counterclockwise at a constant speed by the motor 37, feed the tape at a predetermined speed. Since the magnetic head 50 is kept in contact with the tape as long as the tape-operating means remains at the first position, it works to reproduce music recorded on the tape in advance or to record music.

As mentioned before, the holding means 54 lies in a horizontal alignment with the roof 81 of the cover 80 as long as the tape-operating means stays in the first position. Thus, should the cover 80 be pushed backward by mistake, the roof 81 abuts on the front end surface of the holding means 54 and cannot be pushed further backward. The roof 81 would not therefore hit the magnetic head 50 or the pinch rollers 48 and 49 to do damage to them.

Figure 4:
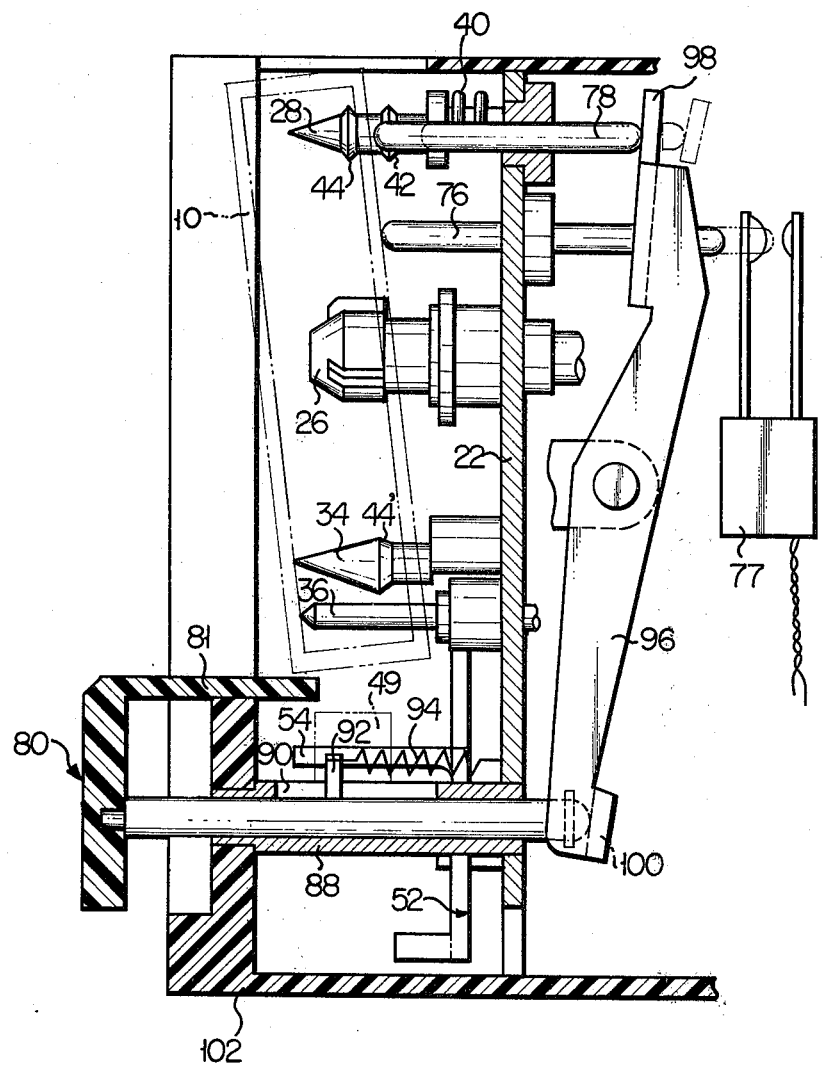
FIG. 4 is another cross sectional view of the apparatus shown in FIG. 1, taken along line 2—2 in FIG. 1 and illustrating a tape cassette placed in a second position.

When the user put a finger on the upper wall of the cassette 10 and pulls it toward him, the cassette 10 is inclined. The lower portion of the peripheral surface defines the first elongated hole 14 then pushes up the first stop means 42 and thus the first cassette-positioning pin 28 against the urging force of the torsion coil spring 40. As the cassette 10 is further inclined, the lower portion of the peripheral surface defines the elongated hole 14 slides on the cylindrical portion of the pin 28 toward the second stop means 44 with the upper portions of the peripheral surfaces define the second and third elongated holes 16 and 18 contacting with the cylindrical portions of the second and third pins 30 and 34. When the lower portion of the peripheral surface defining the first hole 14 reaches the second stop means 44, the cassette 10 stops inclining for a time and takes such a position as shown in FIG. 4. This position of the cassette will hereinafter referred to as "second position". The cassette 10 does not therefore jump out from the apparatus at a breath.

While put in the second position, the cassette 10 is inclined as shown in FIG. 4. The lower portion of the peripheral surface defining the first elongated hole 14 is placed in contact with that cylindrical portion of the pin 28 which lies between the first and second stop means 42 and 44, the upper portion of the peripheral surface defining the second elongated hole 16 in contact with the cylindrical portion of the second pin 30, and the upper portion of the peripheral surface defining the third elongated hole 18 in contact with the cylindrical portion of the third pin 34.

As the cassette 10 is moved from the first position to the second position, the first displacement member 76 moves forward to take the position indicated with the solid line in FIG. 4, urged by the urging means (not shown). The power switch 77 is therefore opened as shown in FIG. 4. The current supply to the motor 37, the amplifier (not shown) and the plunger 72 is stopped, and the motor 37, the amplifier and the plunger 72 are set to the tape-stop mode. Urged by the torsion coil spring 70, the second arm 64 is rocked counterclockwise, thus pulling down the rod 74 and moving down the plate 52 via the first arm 58. As a result, the pinch rollers 48 and 49 and the magnetic head 50, which are mounted on the plate 52, are moved away from the magnetic tape (not shown). At the same time, the holding means 54 moves down to a position below the roof 81 of the cover 80. Since the motor 37 is no longer supplied with current, the reel-driving shafts 24 and 26 and the first and second capstans 32 and 36 stop rotating. Consequently, the magnetic tape (not shown) stops running.

As the cassette 10 is moved from the first to the second position, the second displacement member 78 moves forward to the position shown with a solid line in FIG. 4, urged by the coil spring 94 via the second guide pin 84, the second strip 100, the lever 96 and the first strip 98. That is, the second guide pin 84 moves backward, the second strip 100 moves also backward, the lever 96 rocks counterclockwise, and the first strip 98 moves forward. As the second guide pin 84 moves backward, the cover 80 moves backward, too. As a result, the roof 81 moves so as to block one part of the passage of the tape-operating means as shown in FIG. 4.

In the user wants to run the tape, it is sufficient for him to push the upper wall of the cassette 10 backward until the cassette 10 is brought into the first position. Then the lower portion of the peripheral surface defining the elongated hole 14 slides on the cylindrical portion of the pin 28 toward the first stop means 42 with the upper portions of the peripheral surfaces of the second and third elongated holes 16 and 18 contacting with cylindrical portions of the second and third pins 30 and 34. The lower portion of the peripheral surface defining the first elongated hole 14 then pushes up the first stop means 42 and thus the first pin 28 against the urging force of the torsion coil spring 40. When the lower portion of the peripheral surface defining the first hole 14 reaches the cylindrical portion of the first pin 28 right behind the first stop means 42, the cassette 10 is held at the first position as shown in FIG. 3. The first displacement member 76 is then pushed backward and closes the power switch 77, whereby the motor 37, the amplifier (not shown) and the plunger 72 are set to the tape-running mode again.

To take out the cassette 10 from the apparatus, the user may place his fingers on the left and right walls of the cassette 10, clamp the cassette 10 with the fingers, and strongly pull the cassette 10 toward him while keeping the cassette 10 parallel to the front surface of the chassis 22. As the cassette 10 is pulled, the lower portion of the peripheral surface defining the elongated hole 14 pushes up the second stop means 44 and thus the first cassette-positioning pin 28 against the urging force of the torsion coil spring 40. As the cassette 10 is further pulled, the lower portion of the peripheral surface, defining the hole 14 slides on the conical free end portion of the first pin 28. At the same time, the upper portions of the peripheral surfaces defining the second and third elongated holes 16 and 18 of the cassette 10 slide first on the intermediate portions, or second stop means 44' of the second and third cassette-positioning pins 30 and 34 and then on the conical free end portions of the second and third pins 30 and 34. In this way the cassette 10 is released from the car stereo system.

Once the cassette 10 has been removed from the car stereo system, the first displacement member 76 and the second displacement member 78 take the respective positions which are indicated by two-dot chain lines in FIG. 3. The cover 80 lies at the backward position, having been moved to this position by the coil spring 94 via the second guide pin 94. The roof 81 of the cover 80 therefore blocks the passage of the tape-operating means, i.e. the pinch rollers 48 and 49 and the magnetic head 50, and thus the tape operating means is protected from dust.

This invention is not limited to the above-described embodiment. Various changes or modifications are possible within the scope of the present invention.

In the above-described embodiment a pair of capstans 32 and 36 and a pair of pinch rollers 48 and 49 are used to run a magnetic tape (not shown) at a constant speed. Instead, one capstan and one pinch roller may be used to run a magnetic tape at a constant speed.

In the above-described embodiment, the cassette-positioning pin 28 has two stop means 42 and 44 having flange shapes on its cylindrical portion and is urged downward by the torsion coil spring 40. The first pin 28 therefore serves to hold the cassette 10 in the first position, parallel to the chassis 22 and in the second position, inclined forward from the chassis 22. Further, the first pin 28 functions to guide the cassette 10 from the first position to the second position. Instead, the first pin 28 may be planted on the front surface of the chassis 22, and a leaf spring may be secured to the front surface of the chassis 22 so as to push down the cassette 10, said leaf spring having on its under surface two projections which would function the same way as do the first and second stop means 42 and 44.

Further, the power switch 77 need not be operated by the first displacement member 76. It may be operated by the second displacement member 78, the cover 80 or the lever 96 to set the motor 37 to the tape-running mode or tape-stop mode.

Moreover, to move the cassette 10 from the first position to the second position other means than the user's fingers may be used. For example, an eject lever having a well known structure may be provided to push the cassette 10 forward from the first position and the second position, and further to push the cassette 10 forward from the second position to the outside of the apparatus.

What is claimed is:
1. An apparatus for running magnetic tapes in tape cassettes, comprising:

a plurality of elongated cassette-holding means (28, 30, 34), each of which has a cylindrical portion and a free end portion and which hold at the cylindrical portions thereof a tape cassette (10) containing a roll of magnetic tape selectively in a first position and a second position, said first position being an operating position and said second position being a partially disengaged position where the cassette is retained in said apparatus but not in an operable state, said tape cassette when in said second position being closer to the free end portions of said cassette-holding means than when in said first position;

a first radially extending projection (42) provided on the cylindrical portion of at least one (28) of said cassette-holding means for engaging the tape cassette (10) when it is in said first position for preventing the tape cassette (10) from moving between said first position and said second position;

a second radially extending projection (44, 44') provided on the cylindrical portion of each of said cassette-holding means (28, 30, 34) for engaging the tape cassette (10) when it is in said second position for preventing the tape cassette (10) from being released from said cassette-holding means;

said first and second projections on said at least one cassette-holding means (28) being axially spaced from each other along the length of said at least one cassette-holding means (28);

a tape-running mechanism which has a tape-running mode for running the magnetic tape when the tape cassette is placed in said first position and a tape-stop mode for stopping the magnetic tape; and a switching mechanism responsive to the position of said tape cassette for setting the tape-running mechanism to the tape-running mode by the tape cassette when the tape cassette moves from the second position to the first position and to the tape-stop mode by the tape cassette when the tape cassette moves from the first position to the second position.

2. An apparatus according to claim 1 further comprising:

a tape-operating means movable between a first position where it contacts the magnetic tape when the tape cassette is placed in the first position, and a second position where it is spaced from the magnetic tape;

a cover member movable between a first position where it lies in the passage of the tape-operating means to cover the tape-operating means when the tape-operating means is placed in the second position, and a second position where it is outside the passage of the tape-operating means; and a cover-moving mechanism for moving the cover member from its first position to its second position by the tape cassette when the tape cassette is moved from its second position to its first position and for moving the cover member from its second position to its first position by the tape cassette when the tape cassette is moved from its first position to its second position.

3. An apparatus according to claim 2 further comprising a cover-holding means for holding said cover member in its second position when said tape-operating means is placed in its first position.

4. An apparatus according to claim 3, wherein said cover-moving mechanism includes an urging means for urging said cover member from its second position to its first position.

5. An apparatus according to claim 2, said cover-moving mechanism includes a displacement member which is moved back and forth by the tape cassette when the tape cassette is moved between its first and second positions; and a connecting means which connects the displacement member to said cover member, thereby moving said cover member between its first and second positions when the displacement member is moved back and forth.

6. An apparatus according to claim 5 further comprising a cover-holding means for holding said cover member in its second position when said tape-operating means is placed in its first position.

7. An apparatus according to claim 6, wherein said cover-holding means includes a projection mounted on the tape-operating means and movable with the tape-operating means, said projection lying in a position where it can be in contact with said cover member when said tape-operating means is placed in its first position and said cover member is placed in its second position, and said projection lying in a position where it can be out of contact with said cover member when said tape-operating means is placed in its second position and said cover member is placed in its first position.

8. An apparatus according to claim 7, wherein said cover-moving mechanism includes an urging means for urging said cover member from its second position to its first position.

9. An apparatus according to claim 8, wherein said urging means comprises a coil spring which extends parallel to the direction in which said cover member moves between its first and second positions.

10. An apparatus according to claim 8, wherein said tape-operating means includes a magnetic head and a pinch roller.

11. An apparatus according to any one of claims 1 to 10, wherein said switching mechanism comprises a displacement member which is moved back and forth by the tape cassette when the tape cassette is moved between its first and second positions; and a switching means connected to the displacement member and said tape-operating means for setting said tape-operating means selectively to a tape-running mode and a tape-stop mode in accordance with the movement of the displacement member.

12. An apparatus according to claim 11, wherein each of said cassette-holding means comprises an elongated pin having said cylindrical portion and said free end portion, at least one of said cassette-holding means has an urging means for causing the cylindrical portion of the cassette-holding means to push the tape cassette, and each of said second radially extending projections and said first radially extending projections projecting from its respective elongated pin in the radial direction thereof.

13. An apparatus according to claim 12, wherein the urging means of said cassette-holding means comprises a torsion coil spring having an axis parallel to the elongated pin of said at least one cassette-holding means.

14. An apparatus according to claim 13, wherein said tape-running means comprises a motor; and said switching means comprises a switch for supplying the motor with electrical signals in accordance with the movement of said displacement member.

15. An apparatus according to claim 12, wherein said tape-running means comprises a motor; and said switching means comprises a switch for supplying the motor with electrical signals in accordance with the movement of said displacement member.

16. An apparatus according to claim 12, wherein said cassette-holding means comprises three elongated pins, one of which has both said first and second radially extending projections thereon.

17. An apparatus according to claim 16, wherein said urging means of the cassette-holding means comprises a torsion coil spring having an axis parallel to the elongated pin of said at least one cassette-holding means.

18. An apparatus according to claim 17, wherein said tape-running means comprises a motor; and said switching means comprises a switch for supplying the motor with electrical signals in accordance with the movement of said displacement member.

19. An apparatus for running magnetic tapes in tape cassettes, comprising:

a plurality of elongated cassette-holding means each of which has a cylindrical portion and a free end portion and which hold at the cylindrical portions thereof a tape cassette containing a roll of magnetic tape selectively in a first position and a second position, said first position being an operating position and said second position being a partially disengaged position where the cassette is retained in said apparatus but not in an operable state, said tape cassette when in said second position being closer to the free end portions of said cassette-holding means that when in said first position;

first stop means provided on the cylindrical portion of at least one of said cassette-holding means for engaging the tape cassette (10) when it is in said first position for preventing the tape cassette from moving between said first position and said second position;

second stop means provided on the cylindrical portion of each of said cassette-holding means for engaging the tape cassette (10) when it is in said second position for preventing the tape cassette from being released from said cassette-holding means;

a tape-running mechanism which has a tape-running mode for running the magnetic tape when the tape cassette is placed in said first position and a tape-stop mode for stopping the magnetic tape;

a switching mechanism responsive to the position of said tape cassette for setting the tape-running mechanism to the tape-running mode by the tape cassette when the tape cassette moves from the second position to the first position and to tape-stop mode by the tape cassette when the tape cassette moves from the first position to the second position;

a tape-operating means movable between a position where it contacts the magnetic tape when the tape cassette is placed in the first position, and a second position where it is spaced from the magnetic tape;

a cover member movable between a first position where it lies in the passage of the tape-operating means to cover the tape-operating means when the tape-operating means is placed in the second position, and a second position where it is outside the passage of the tape-operating means; and a cover-moving mechanism for moving the cover member from its first position to its second position by the tape cassette when the tape cassette is moved from its second position to its first position and for moving the cover member from its second position to its first position by the tape cassette when the tape cassette is moved from its first position to its second position.

20. An apparatus for running magnetic tapes in tape cassettes, comprising:

a plurality of elongated cassette-holding means each of which has a cylindrical portion and a free end portion and which hold at the cylindrical portions thereof a tape cassette containing a roll of magnetic tape selectively in a first position and a second position, said first position being an operating position and said second position being a partially disengaged position where the cassette is retained in said apparatus but not in an operable state, said tape cassette when in said second position being closer to the free end portions of said cassette-holding means that when in said first position;

first stop means provided on the cylindrical portion of at least one of said cassette-holding means for engaging the tape cassette (10) when it is in said first position for preventing the tape cassette from moving between said first position and said second position;

second stop means provided on the cylindrical portion of each of said cassette-holding means for engaging the tape cassette (10) when it is in said second position for preventing the tape cassette from being released from said cassette-holding means;

a tape-running mechanism which has a tape-running mode for running the magnetic tape when the tape cassette is placed in said first position and a tape-stop mode for stopping the magnetic tape; and a switching mechanism responsive to the position of said tape cassette for setting the tape-running mechanism to the tape-running mode by the tape cassette when the tape cassette moves from the second position to the first position and to tape-stop mode by the tape cassette when the tape cassette moves from the first position to the second position;

said switching mechanism comprising a displacement member which is moved back and forth by the tape cassette when the tape cassette is moved between its first and second positions; and a switching means connected to the displacement member and to said tape-operating means for setting said tape-operating means selectively to a tape-running mode and a tape-stop mode in accordance with the movement of the displacement member.

* * * * *

UNITED STATES PATENT AND TRADEMARK OFFICE
CERTIFICATE OF CORRECTION

PATENT NO. : 4,342,058
DATED : July 27, 1982
INVENTOR(S) : Akira OSANAI

It is certified that error appears in the above-identified patent and that said Letters Patent is hereby corrected as shown below:

COLUMN 1, line 51, change "in the the car" to --in car--;

COLUMN 2, line 41, change "of man's jacket" to --of a man's jacket--;

COLUMN 2, line 68 (last line), change "parallel to with front" to --parallel with the front--;

COLUMN 12, line 46 (claim 19), change "means that" to --means than--;

COLUMN 13, lin 34, (claim 20), change "means that" to --means than--.

Signed and Sealed this

Sixteenth Day of November 1982

[SEAL]

Attest:

GERALD J MOSSINGHOFF

Attesting Officer    Commissioner of Patents and Trademarks